United States Patent [19]

Saitoh

[11] Patent Number: 5,183,617

[45] Date of Patent: Feb. 2, 1993

[54] METHOD OF MANUFACTURING A HERMETIC SEALING APPARATUS FOR SEALING TWO MEMBERS WHICH ROTATE RELATIVE TO EACH OTHER

[75] Inventor: Takayuki Saitoh, Fukushima, Japan

[73] Assignee: NOK Corporation, Tokyo, Japan

[21] Appl. No.: 775,331

[22] Filed: Oct. 11, 1991

Related U.S. Application Data

[63] Continuation-in-part of Ser. No. 627,892, Dec. 13, 1990, Pat. No. 5,106,565, which is a continuation of Ser. No. 260,406, Oct. 20, 1988, abandoned.

[51] Int. Cl.$^5$ .............................................. B29C 43/18
[52] U.S. Cl. ..................................... 264/249; 264/263; 264/266; 264/268; 425/DIG. 47
[58] Field of Search ............... 264/138, 266, 262, 268, 264/263, 249; 425/DIG. 47; 29/451

[56] References Cited

U.S. PATENT DOCUMENTS

| | | | |
|---|---|---|---|
| 3,493,645 | 2/1970 | Sanderson et al. | 264/268 |
| 4,038,359 | 7/1977 | Pendleton | 264/263 |
| 4,171,561 | 10/1979 | Bainard | 264/268 |
| 4,406,847 | 9/1983 | O'Neal et al. | 264/266 |
| 4,464,322 | 8/1984 | Butler | 264/138 |
| 4,723,350 | 2/1988 | Kobayashi et al. | 425/DIG. 47 |
| 5,082,612 | 1/1992 | Butler et al. | 264/268 |
| 5,104,603 | 4/1992 | Saitoh | 264/263 |

Primary Examiner—Jan H. Silbaugh
Assistant Examiner—Brian J. Eastley
Attorney, Agent, or Firm—Kenyon & Kenyon

[57] ABSTRACT

A method of manufacturing a hermetic sealing apparatus for two members rotating relative to each other includes placing an annular metal backup ring having an L-shaped cross section in a mold with a radially inward flange portion of the annular metal backup ring having a plurality of circumferentially spaced holes. The mold has a central core and the outer peripheral surface of the central core is provided with a spiral groove. A conical shaped PTFE resin material sheet for forming a second annular seal ring is placed in the mold. A rubber-like resilient material for forming a first annular seal ring is placed in the mold and subjected to pressure. The molding pressure deforms the second annular seal ring material so that it protrudes into the holes of the flange portion of the annular metal backup ring. This firmly secures and fixes the second annular seal ring between the first seal ring and the annular metal backup ring.

2 Claims, 3 Drawing Sheets

METHOD OF MANUFACTURING A HERMETIC SEALING APPARATUS FOR SEALING TWO MEMBERS WHICH ROTATE RELATIVE TO EACH OTHER

This application is a continuation-in-part of application Ser. No. 07/627,892 filed Dec. 13, 1990, now U.S. Pat. No. 5,106,565, which is a continuation of Ser. No. 07/260,406 filed Oct. 20, 1988 (now abandoned).

BACKGROUND OF THE INVENTION

The present invention relates to a method of manufacturing a hermetic sealing apparatus which is adapted to seal two members which rotate relative to each other.

Conventionally, for instance, an apparatus shown in FIG. 3 is known as a hermetically sealing apparatus of this type. In this conventional example, the hermetically sealing apparatus is provided with a first seal ring having a seal lip 100 made of a rubber-like resilient material, a tip 102 of the seal lip 100 abuts against a rotating shaft, thereby constituting a first seal portion. The hermetically sealing apparatus is further provided with a second seal ring having a seal lip 103 made of a resin and extending along a side surface of the first seal ring on the atmosphere side, and a tip 104 of the seal lip 103 abuts against the rotating shaft, thereby constituting a second seal portion. The seal lip 100 made of the rubber-like resilient material is backed up by the seal lip 103 which has a low level of frictional resistance so as to restrain an increase in the contact surface pressure of a hermetic fluid under high pressure, thereby restraining an increase in sliding resistance between the seal lip 100 and the rotating shaft. This arrangement makes it possible to reduce the abrasion of the seal lip 100 and improve the durability thereof. The second seal ring is held by a backup ring 105. In order to fabricate such a hermetically sealing apparatus, the following procedure is generally taken: Using a rubber-like resilient material, the seal lip 100 is obtained by a process of forming the seal lip 100 by vulcanization. The resin-made seal lip 104 is obtained by subjecting a resin-made seal lip to a bending process. These seal lips 100 and 104 are superposed on the metallic reinforcing ring 105 and are fixed to each other by bonding with an adhesive or by calking a metallic outer ring 106, securing the ends of the superposed members.

However, in accordance with the arrangement of such a conventional example described above, since the affinity between the resin and rubber is poor and it is impossible to obtain a sufficient bonding force, it is necessary to provide a process in which the joint surface of the resin-made seal lip on the rubber-like seal lip side is preliminarily processed by means of metal sodium or the like for good fitting to the adhesive before jointing is effected. When securing by calking is effected, it is necessary to use the metallic outer ring, so that the number of parts disadvantageously increases. Accordingly, in cases where either of the fixing methods is used, the number of processes involved until completion of the hermetically sealing apparatus becomes undesirably numerous. Hence, there has been a drawback in that the production cost is high.

SUMMARY OF THE INVENTION

Accordingly, an object of the present invention is to provide a method of manufacturing a hermetically sealing apparatus which is capable of sufficiently sealing two members which rotate relative to each other by positively securing members without employing an extra member or an extra process, thereby overcoming the above-described drawbacks of the prior art.

In accordance with the present invention, there is provided a method of manufacturing a hermetic sealing apparatus for sealing two members rotating relative to each other with a lubricant on one side and atmosphere on another side, wherein the hermetic sealing apparatus comprising a first annular seal ring made of rubber-like resilient material on the lubricant side, a second annular seal ring made of resin material on the atmosphere side, and an annular metal backup ring.

A mold is provided having a central core. A conical resin sheet is prepared for the second annular seal ring.

The annular metal backup ring is placed in the mold. The annular metal backup ring has a substantially L-shaped cross section composed of a cylindrical portion and a radially inward extending flange portion with a plurality of circumferentially spaced holes formed in the flange portion.

The second annular seal ring entirely made of polytetrafluoroethlene is placed in the mold with a circumferential portion of the second annular seal ring covering the flange portion of the annular metal backup ring so that one end portion of the second annular seal ring abuts against a flange portion of the L-shaped annular metal backup ring and another end portion leans on the central core of the mold.

The rubber-like resilient material for forming the first annular seal ring is placed in the mold. The rubber-like resilient material contacts the cylindrical portion of the annular metal backup ring and an inner side surface of the second seal ring. The rubber-like resilient material is subjected to pressure to form the first annular seal ring.

The second annular seal ring is deformed so as to protrude into each of the holes of the flange portion of the annular metal backup ring by the pressurized rubber-like resilient material.

Therefore, the protruding of the second annular seal ring into the holes of the flange portion of the annular metal backup ring firmly secures and fixes the second annular seal ring between the first seal ring and the flange portion.

The above and other objects of the present invention will become more apparent when read in conjunction with the following description of the invention.

DESCRIPTION OF THE PREFERRED EMBODIMENT

Figure 1:
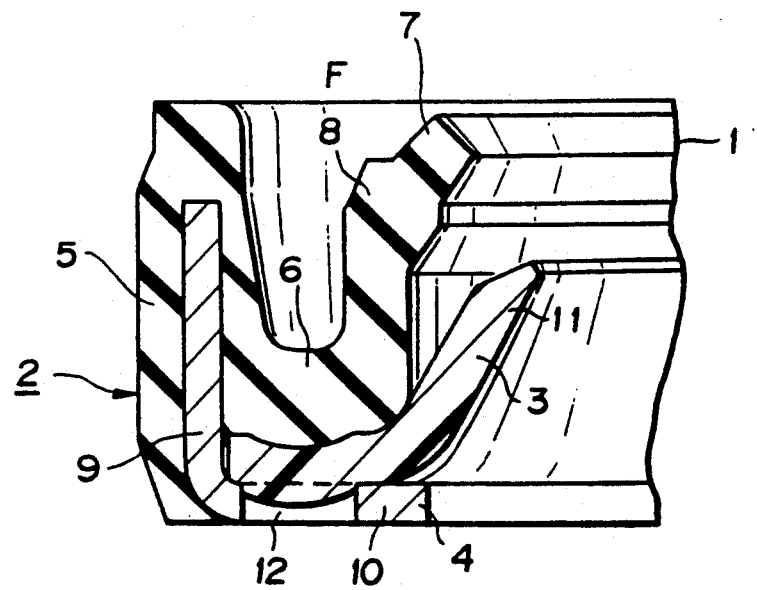
FIG. 1 is a cross-sectional view of a hermetically sealing apparatus in accordance with the present invention.

FIG. 1 shows a hermetically sealing apparatus 1 in accordance with the present invention. The arrangement of this hermetically sealing apparatus 1 is such that a first seal ring 2 disposed on the hermetically sealed fluid side and made of a rubber-like resilient material, a second sedal ring 3 made of a reinforced plastic (PTFE), and a metallic backup ring 4 are combined and fixed. A seal ring 3 is clamped by the first seal ring 2 and the backup ring 4. In other words, the first seal ring 2 comprises: an outer tube portion 5 fitted with an inner peripheral portion of a housing (not shown); an annular support portion 6 extending from a mid-portion of the outer tube portion 5 inwardly in the radial direction; and a seal lip 8 for forming a seal portion with a tip 7 of the lip seal 8 hermetically abutting against a surface of a shaft. The first seal ring 2 is assembled by being baked integrally with the backup ring 4. The backup ring 4 has an L-shaped cross section, and comprises a cylindrical portion 9 which is embedded in the outer tube portion 5 of the first seal ring material 2 to serve as a core for the outer tube 5, as well as a flange 10 extending from a side end portion of the cylindrical portion 9 inwardly in the radial direction. The second seal ring 3 is clamped by this flange 10 and the support portion 6 of the first seal ring 2.

The second seal ring 3 is a tubular member formed by a resin material such as a reinforced plastic (PTFE), and an inside-diameter side thereof is bent toward a hermetic fluid side to constitute a seal lip 11. A tip of this resin-made seal lip 11 extends to a tip of the seal lip 8 of the first seal ring material 2 so as to support a force applied to the seal lip 8 of the first seal ring material 2.

A plurality of fixing holes 12 for preventing the rotation of the second seal ring 3 are provided in a contact portion between the second seal ring 3 and the backup ring 4, i.e., in the flange 10 of the backup ring 4. Namely, as shown in FIG. 1, the holes 12 are provided in a central portion of the flange 10 of the backup ring 4 at predetermined intervals in a circumferential direction. This arrangement is such that the seal ring 3 enters these holes 12 during vulcanization molding.

In the hermetically sealing apparatus thus constructed, when the rotating shaft moves relative to the housing, since the second seal ring 3 is fitted in the holes 12 provided in the backup ring 4 at the time of molding, so that the second seal ring 3 is prevented from coming off the backup ring 4 owing to a frictional force applied by the rotation of the rotating shaft. In addition, since the seal ring is fixed to the housing, the seal ring does not move. Consequently, since the respective parts are secured positively in such a manner that no circumferential offset occurs among the first seal ring 2, the second seal ring 3, and the backup ring 4, so that it is possible to maintain stable hermetic performance.

Figure 2:
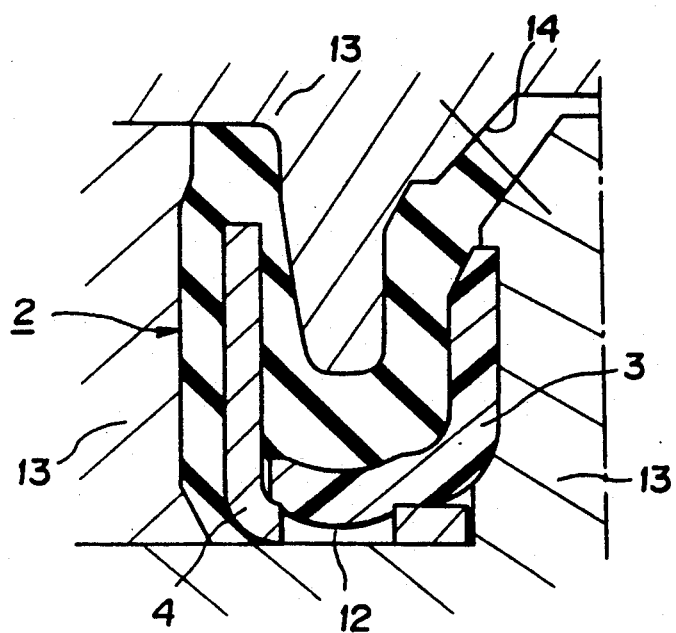
FIG. 2 is a cross-sectional view of the hermetically sealing apparatus illustrating a method of assembling members of the hermetically sealing apparatus shown in FIG. 1.
Figure 3:
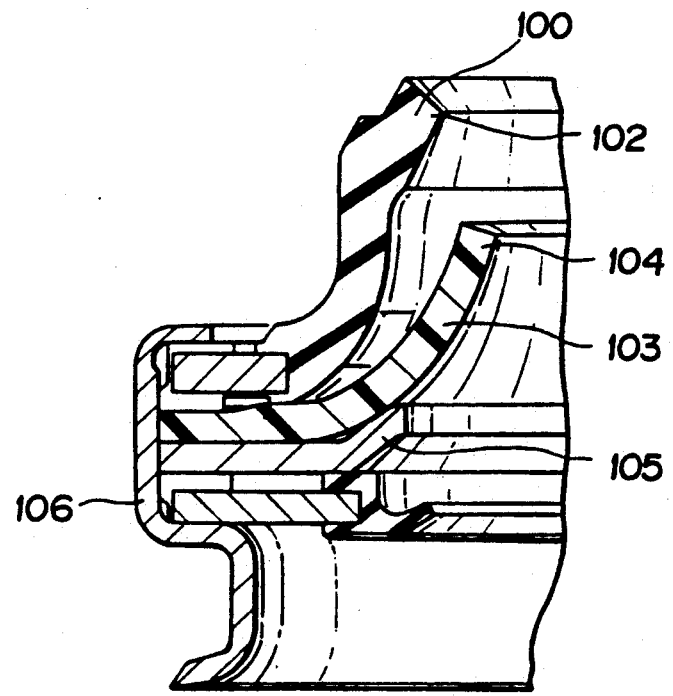
FIG. 3 is a partial cross-sectional view of the conventional hermetically sealing apparatus.

Referring now to FIG. 2, a description will now be given of a method of fabricating the hermetically sealing apparatus having the above-described construction. FIG. 2 shows a process for vulcanizing a rubber material for forming the first seal ring 2. The metallic backup ring 4 processed separately in advance and a seat of the resin-made second seal ring 3 are arranged in a cavity 14 of a mold. Then, after dies 13 are closed, the rubber material is filled into the cavity 14 in the injection molding method, whereas before dies 13 are closed, unvulcanized rubber material of the amount more than necessary is applied on the resin material and the dies 13 are then closed in the compression molding method, to effect the vulcanization molding of the first seal ring 2. At this juncture, the second seal ring 3 is pressed against the backup ring 4 by a filling pressure of the rubber material, and the second seal ring 3 enters the holes 12 owing to this pressing force. As a result, projections corresponding to the holes formed in the flange 10 are formed, thereby firmly securing the second seal ring 3 to the backup ring 4. Subsequently, after the rubber material has hardened, the dies are opened and the molding is removed. During molding, the tip portion of the seal ring 3 is jointed to the first seal ring 2 inwardly in the radial direction thereof. However, after the dies are opened and the molding is removed, the tip portion of the second seal ring 3 is separated from the first seal ring 2 and returns to its predetermined position.

Thus, in the hermetically sealing apparatus in accordance with the present invention, the second seal ring and the backup ring are jointed and fixed to each other during the vulcanization molding of the first seal ring, and the number of processes for assembling various members can be reduced. Hence, it is possible to increase the productivity and reduces the production cost. Furthermore, since the number of assembly processes can be reduced, the frequency of occurrence of assembly errors can also be reduced, thereby making it possible to increase the product quality.

Figure 4:
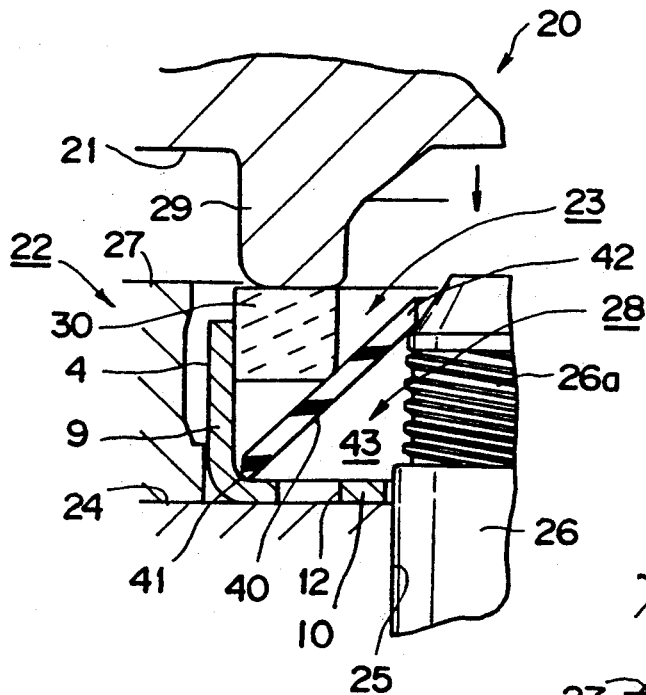
FIGS. 4 and 5 illustrate in cross-section a preferred method for manufacturing a sealing apparatus in accordance with the present invention.
Figure 5:
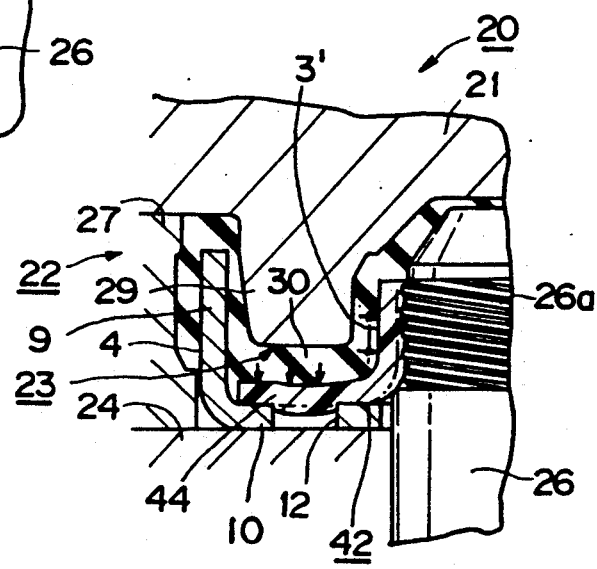

FIGS. 4 and 5, illustrate a sealing apparatus manufactured by a preferred method in accordance with the present invention.

Referring to FIGS. 4 and 5, when a rubber-like resilient material 30 for forming the first annular seal ring 2 and a PTFE resin sheet 40 for forming the second annular seal ring are set in a mold 20, the resin sheet 40 is preliminarily formed in a conical washer shape and then set so as to cover an opening of a mold cavity 23. The rubber material 30 is then laid on the thus formed resin sheet 40, heated and pressurized after the mold clamping process.

The mold 20 is composed of an upper mold half 21 and a lower mold half 22. The low mold half 22 comprises a mold body 24, a core 26 fitted into a central hole 25 of the mold body 24 so as to project upwardly as viewed and an annular ring mold member 27 arranged on the upper surface of the mold body 24 concentrically with the core 26 with a predetermined space. In such arrangement, an annular recess 28, rectangular in cross section, having an upper opened portion between the outer periphery of the core 26 and the inner periphery of the ring mold member 27.

The outer peripheral portion of the core 26 has a shape suitable for molding a resin seal lip, and a spiral screw groove 26a is formed on the outer peripheral portion of the core 26. The upper mold half 21 is moved towards or away from the ring mold member 27 of the lower mold half 22 to close the annular recess 28 to thereby form the cavity 23. The upper mold half 21 is provided with an annular projection 29 which is intruded into the annular recess 28.

As described above, the resin sheet 40 entirely made of PTFE is preliminarily formed in a conical washer shape provided with an outer end portion 41 which is engageable with a corner angled portion of an annular metal backup ring 4, having substantially an L-shaped cross section and composed of a cylindrical portion 9 and a radially inward extending flange portion 10 with a plurality of circumferentially spaced holes formed in the flange portion 10. The flange portion 10 is rested on the mold body 24 in the bottom of the annular recess 28 of the lower mold half 22. The second annular seal ring 40 made of conical resin sheet is also provided with an inner end portion 42 leaning on the upper end of the core 26 of the lower mold half 22 to thereby close the opening of the cavity 23. According to such arrangement, a space is formed having a normal triangle cross section between the resin sheet 40, the outer peripheral portion of the core 26 and the flange portion 10 of the annular metal backup ring 4 with the resin sheet being the oblique side.

Figure 6:
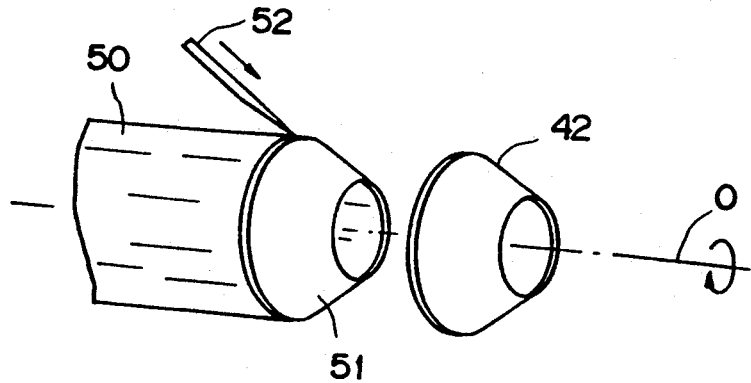
FIG. 6 illustrates a method for manufacturing a conical resin sheet for use as the second annular sealing ring in accordance with the present invention.

The conical resin sheet 40 may be formed by various methods, for example, as shown in FIG. 6, by cutting a thickened cylindrical resin material 50, that is PTFE material, with a cutter 52.

Namely, a cylindrical resin material 50 having a tapered conical front end 51 is preliminarily prepared. The cutter 52 is positioned at an angle parallel to the tapered surface of the front end of the resin material 50 on the outer periphery of the resin material 50 and the resin material 50 is then rotated about its central axis, thus the conical resin sheet 40 can be cut out with a predetermined thickness.

The rubber material 30 formed in an annular shape having a rectangular cross section is laid in a manner overlapped on the thus formed resin sheet 40, and the resin sheet 40 is pressed downwardly by the annular projection of the upper mold half 21. In the next step, the resin sheet 40 subjected to heating and softening by the mold clamping pressure is bent at its central portion towards the interior of the space 43 towards between the annular recess 28 and the resin sheet 40, whereby the inner end portion thereof is forced against the outer peripheral portion of the core 26 to thereby form a cylindrical seal lip 3' having a shape along the outer peripheral portion of the core 26 and the outer end portion thereof is forced against the inward flange portion 10 of the annular metal backup ring 4 to thereby form a flange portion 44 having a shape along the flange portion 10 of the ring 4. In such arrangement, when the mold clamping pressure is applied, the flanged portion 44 bites in holes 12 of the annular metal backup ring 4, thus being firmly secured.

As described above, by preliminarily forming the resin sheet 40 in the conical washer shape, the outer end portion forming the flange portion 44 and the inner end portion forming the seal lip 3' are bent by substantially the same degree in bent amounts, thus being excellent in the molding performance. Furthermore, by positioning the outer end portion 41 at the corner angle portion of the reinforcing ring 4 to close the opening of the annular recess 28, the intrusion of the fluidized rubber material 30 into the back side of the resin sheet 40 can be preferably prevented and the clamping pressure can thus be effectively applied for the formation of the resin sheet 40.

In addition, since the outer peripheral surface of the core 26 to which the inner end portion of the resin sheet 40 is pressed is provided with the spiral groove 26a, such spiral groove is also formed to the inner surface of the softened resin sheet 40, whereby the grooved seal lip 3' can be formed simultaneously with the vulcanization formation step.

After the molding operation, the mold halves 21 and 22 are opened and the unnecessary portion of the mold product is cut whereby the rubber elastic seal lip 8 of the first seal ring 2 can be manufactured.

What is claimed is:

1. A method of manufacturing a hermetic sealing apparatus for sealing two members rotating relative to each other with a lubricant on one side and atmosphere on another side, said hermetic sealing apparatus comprising a first annular seal ring made of rubber-like resilient material on the lubricant side, a second annular seal ring made of resin material on the atmosphere side, and an annular metal backup ring, said manufacturing method comprising the steps of:

providing a mold having a central core;

preparing a conical resin sheet for the second annular seal ring said resin sheet being entirely made of polytetrafluorethlene;

placing said annular metal backup ring in said mold, said annular metal backup ring having substantially an L-shaped cross section composed of a cylindrical portion and a radially inward extending flange portion with a plurality of circumferentially spaced holes formed in said flange portion;

placing said second annular seal ring entirely made of polytetrafluoroethlene in said mold with a circumferential portion of said second annular seal ring covering said flange portion of said annular metal backup ring so that one end portion of said second annular seal ring abuts against the flange portion of the L-shaiped annular metal backup ring and another end portion leans on the central core of the mold;

placing the rubber-like resilient material for forming said first annular seal ring in said mold, said rubber-like resilient material contacting said cylindrical portion of said annular metal backup ring and an inner side surface of said second seal ring, and subjecting said rubber-like resilient material to pressure to form said first annular seal ring; and deforming said second annular seal ring so as to protrude into each of said holes of said flange portion of the annular metal backup ring by the pressurized rubber-like resilient material;

whereby said protruding of the second annular seal ring into the holes of said flange portion of the annular metal backup ring firmly secures and fixes said second annular seal ring between said first seal ring and said flange portion.

2. A method according to claim 1, wherein said core is provided with an outer peripheral surface in which a spiral groove is formed.

* * * * *